UNITED STATES PATENT OFFICE.

HERMANN DE PURY, OF NEUCHATEL, SWITZERLAND, ASSIGNOR TO ATOXICAFE S. A., OF CLARENS, MONTREUX, SWITZERLAND, A CORPORATION OF SWITZERLAND.

PROCESS OF REMOVING THE TOXIC CONSTITUENTS FROM COFFEE.

1,041,160.  Specification of Letters Patent.  Patented Oct. 15, 1912.

No Drawing.  Application filed May 28, 1912.  Serial No. 700,285.

*To all whom it may concern:*

Be it known that I, HERMANN DE PURY, a citizen of the Swiss Confederation, residing at Neuchatel, in the Canton of Neuchatel, Switzerland, have invented certain new and useful Improvements in Processes of Removing the Toxic Constituents from Coffee, of which the following is a specification.

The subject of the present invention is a process for destroying the toxic materials contained in the raw beans of the coffee plant.

This process comprises two principal operations, the first of which consists in subjecting the raw coffee beans to an operation having for its object to cause the bursting of the ligneous cells in the interior of which the toxic materials are located.

The second operation consists in roasting them in the presence of a current of air at a high temperature, approximately equal to that at which coffee beans are roasted, the ligneous cells of the beans being opened by the above operation. By this second operation the coffee loses, on the one hand, by volatilization all the volatile toxic constituents which are driven off by the hot current of air, and, on the other hand, by sublimation loses all the free caffeine.

The first operation may be effected by one or other of the known processes, for example, by germination or by subjecting the beans in an autoclave alternatively to steam under pressure and to a vacuum.

The roasting operation may be effected in a roasting apparatus of any suitable kind provided that it permits the passage of a current of hot air through the mass of coffee.

By the process above described all the toxic constituents in the coffee are eliminated without the employment of chemicals.

I claim:—

The process of removing the toxic constituents from coffee, comprising two successive operations, which consist in causing the ligneous cells of the green coffee bean to burst, and then roasting the beans in the presence of a current of hot air.

In testimony whereof I have affixed my signature in presence of two witnesses.

HERMANN DE PURY.

Witnesses:
E. C. MEDARIS,
G. H. STRAUSS.